Sept. 8, 1964

G. J. NOLTES 3,147,783

EGG OPENER AND SEPARATOR

Filed July 18, 1962

Inventor
Harrit J. Noltes.
By
Watson, Cole, Grindle & Watson
Attorneys

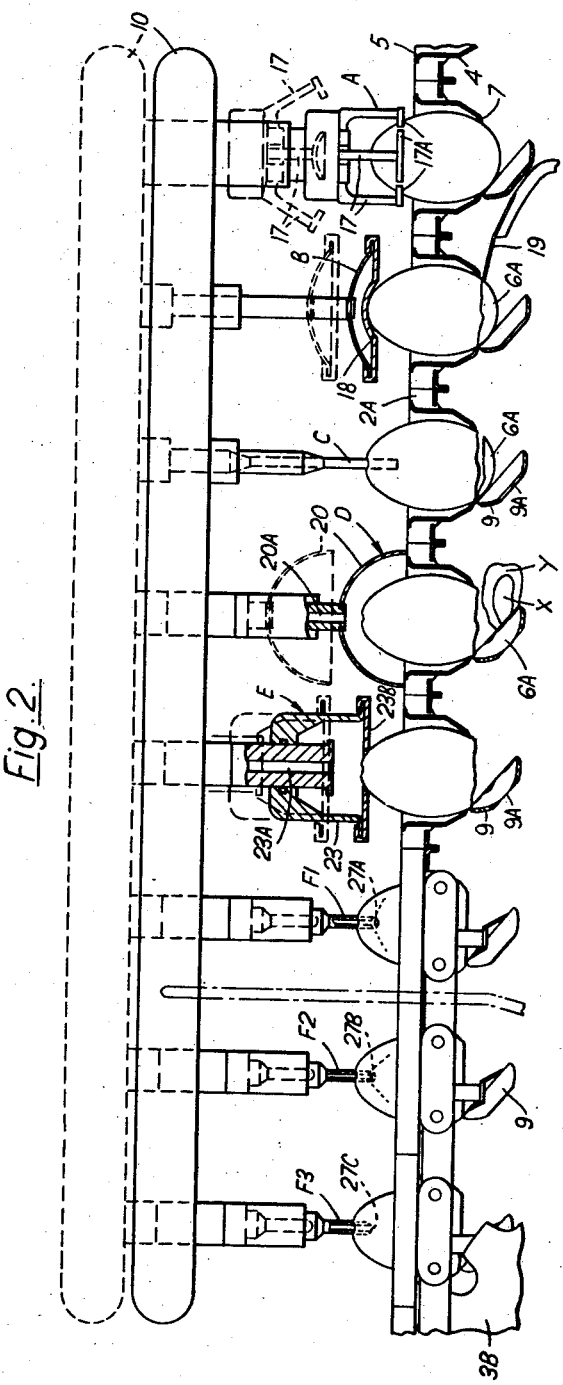

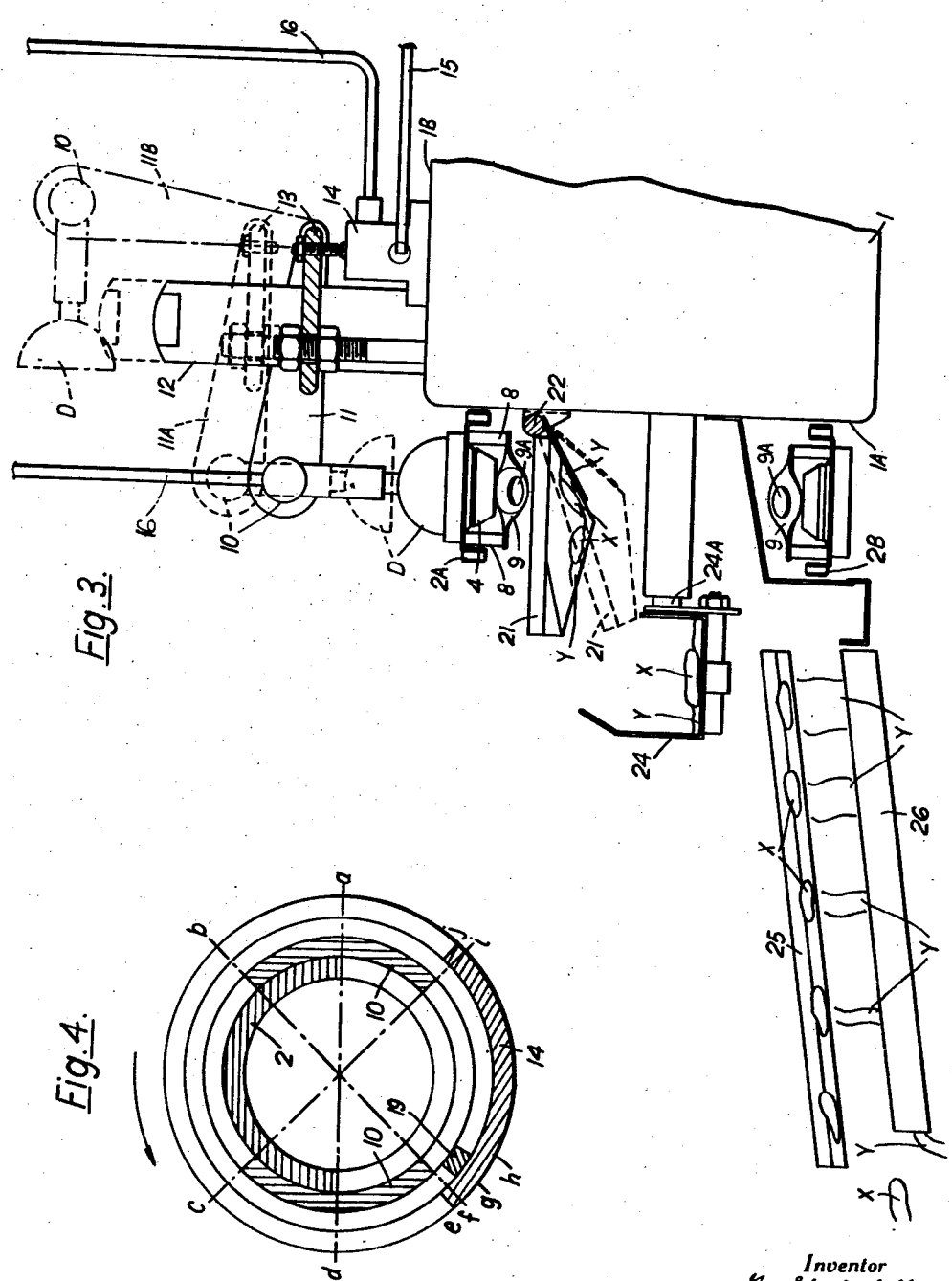

United States Patent Office 3,147,783
Patented Sept. 8, 1964

3,147,783
EGG OPENER AND SEPARATOR
Gerrit Jan Noltes, Sarphatistraat 18B,
Amsterdam, Netherlands
Filed July 18, 1962, Ser. No. 210,778
Claims priority, application Great Britain, July 5, 1962,
25,724/62
11 Claims. (Cl. 146—2)

This invention relates to machines for emptying eggs.

Machines are known for piercing eggs and emptying them, yolk and white together, by means of a current of air. Separating devices are also known, for the reception together of the yolk (unbroken) and the white of eggs broken by hand, the whole contents of each egg being first received on an inclined shoot having a lengthwise bottom slot for the passage of the white to another shoot underneath but narrow enough to retain the yolk, so that the yolk and the white can be delivered to separate receptacles by the respective shoots.

The principal object of the present invention is to provide a machine for emptying eggs without breaking the yolks, particularly suitable for use with a separating device of the type referred to for the separate collection of the yolks and the whites. A further object is to provide such machine with means, involving but little supervision, for dealing with the cases of (a) a yolk accidentally broken in the emptying of an egg, and (b) of eggs proving to be bad when emptied. Another object is to provide in such machines for effective emptying of eggs that vary from circular cross-section when viewed in the direction of their axes.

Still further objects and advantages of the invention will appear from the following description of the invention and preferred embodiment.

According to the present invention, a machine for emptying eggs comprises a conveyor provided with a spaced succession of cups, means to guide the conveyor along a run in which the mouths of the cups are uppermost, the bottom of each cup having a circular orifice to embrace the big end of an egg with significant protrusion, a succession of operating heads disposed above the run of the conveyor, the heads having the same spacing as the cups, the conveyor being movable to bring each cup to rest under each head in turn and the heads being movable between raised and lowered positions, in which latter position they come into operative association with eggs in cups below them, one head serving to hold an egg down in its cup and being associated with slicing means for partial severance of a cap from the protruding big end of the egg, the next head serving to pierce a hole in the little end of the egg, and the next head serving to enclose the mouth of the cup and having a connection to a supply of gaseous pressure for application to the enclosure and also to the interior the egg through the pierced hole to discharge the contents of the egg by displacement of the big end cap under the internal pressure, and a receiving tray close under the bottom of the cup to catch the discharged contents.

A holder for the big end cap severed from an egg may be carried in downwardly inclined position from one edge of the bottom orifice of each cup.

Preferably, the machine has a preliminary head to engage the periphery of the shell of an egg between its little end and its maximum cross-section, for centering of the egg in its cup.

If the cross-section of the egg is circular, at least where it fits the circular bottom orifice of the cup, the fitting of the centreed egg to that orifice provides bottom-sealing of the enclosure to which the gaseous pressure is applied after piercing of the little end. If, however, a non-circular egg prevents bottom-sealing, a further head with which the machine is preferably provided is disposed subsequent to the head that encloses the mouth of a cup and formed with a hood having a resilient bottom orifice to effect sealing round the pierced hole in the little end, the hood having a connection to a supply of gaseous pressure, so that the contents of the egg can be discharged by the application of that pressure through the hole.

One or more further and subsequent heads may also be provided, with a nozzle to enter the pierced hole and tangential holes to discharge inside the shell, the nozzle having a connection to a supply of gaseous pressure and serving for the removal of residual white from the shell. White so removed may be caught in a tray separate from that provided to catch the white discharged with the yolk.

The tray to catch the contents, yolk and white together, is preferably pivotally mounted, for retention of the contents at the will of the operator, and for discharge of the contents laterally of the machine. The pivotally mounted tray serves a triple purpose: (1) it enables the contents of one or more (say up to four) eggs to be retained at the option of the operator, before discharge for ultimate collection; (2) it enables contents containing a broken yolk to be separately disposed of; and (3) it likewise enables the contents of a bad egg to be separately disposed of. Advantageously, a second tray, with both ends open, is provided, this being transversely pivoted between its ends, so that it may be appropriately tilted by the operator towards either end, one end leading to the ultimate collecting means for the whole yolks and the whites, viz., separating means of the type referred to, and the other end leading to collecting means for contents that either contain a broken yolk or are bad.

The conveyor is preferably endless, with an upper run serving to bring the cups into register with the heads, and a lower run co-operating with means for ejecting a big end cap that may still be retained in the holder of a cup.

A preferred embodiment of the machine will now be described in detail with reference to the accompanying diagrammatic drawings, in which FIGURE 1 is a side elevation of the machine, partly in section;

FIGURE 2 is an enlarged view with certain parts in section of the upper central portion of the machine as seen in FIGURE 1;

FIGURE 3 is a transverse section of FIGURE 1, taken to a larger scale on the line III—III of that figure; and FIGURE 4 is a timing diagram for each cycle of operation of the machine.

Figure 1:
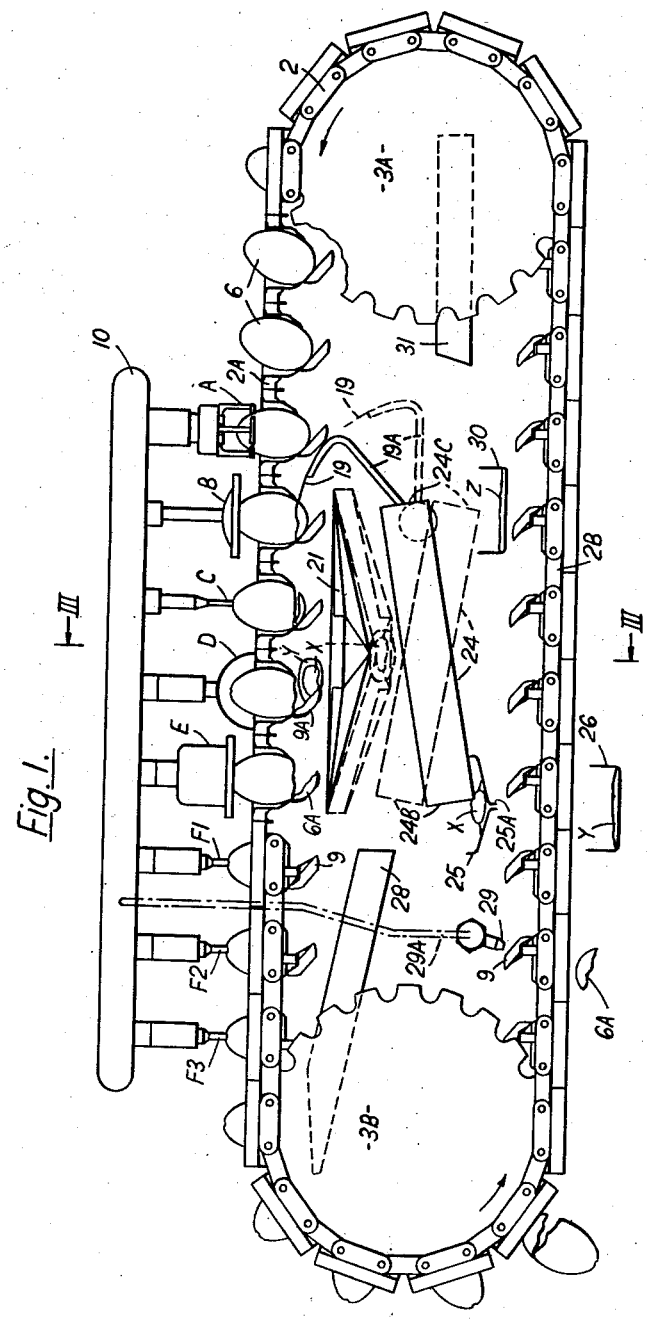

The frame 1 of the machine is shown in FIGURE 3 only. Beyond the front face 1A of the frame 1 runs an endless chain conveyor 2 running on vertical sprockets 3A, 3B (FIGURE 1) to provide upper and lower runs 2A, 2B. Alternate links of the chain 2 carry cups 4, which will now be described in relation to their mouth-upwards position in the upper run 2A.

The mouth 5 of each cup 4 is flush with the upper edges of the links of the chain 2 and is of a diameter to admit with clearance an egg 6 deposited by hand or mechanically, big end down, above the sprocket 3A, the run 2A moving from right to left (FIGURES 1 and 2). The bottom of the cup 4 closes to a bottom orifice 7, of a size to permit the big end to protrude to a significant extent, the depth of the cup being such that more than one-half of the length of an egg is contained within it, leaving the little end protruding substantially above the mouth 5. Depending pillars 8 carry a concave holder 9 in a position inclined downwardly from the left-hand edge of the orifice 7. The concave side of the holder is directed towards the orifice 7 and the holder has a central opening 9A.

The probability is that a deposited egg 6 will assume an inclined position in a cup 4, and the first operation of the machine on an egg is to position it vertically. This first operation is performed by the first of a series of heads A, B, C, D, E, F1, F2, F3, spaced above and along the upper run 2A with the same spacing as the cups 4. The heads depend from a horizontal pipe 10 carried by arms 11 (one only shown in FIGURE 3) projecting from above the top face 1B of the frame 1 and mounted on standards 12 (one only shown in FIGURE 3) raised (to a position 11A) and lowered by means (not shown) inside the frame. The arms 11 can also be swung into a vertical position 11B to bring the heads into convenient position for cleaning or other attention. Also raised and lowered with the standards 12 is a bar 13, which in lowered position opens a valve 14 to admit gaseous pressure from a supply line 15 to a flexible connection 16 leading to the pipe 10.

The conveyor 2 is driven intermittently (by means—not shown—inside the frame 1) to bring each cup 4 in turn below one of the heads A . . . F3 while the heads are raised, and the heads are then lowered. At the head A, the little end of the egg 6 finds itself embraced by the ends 17A of four arms 17, which coact with the egg in any suitable manner such that the egg passes to the head B in a vertical position by resting correctly on the bottom orifice 7.

At the head B, a resilient disc 18 is pressed on to the little end, to hold the egg while a slicing knife 19 on an arm 19A that is oscillated by means (not shown) inside the frame 1, for the knife to cut a groove through the big end just below the orifice 7, thus cutting a cap 6A from the egg. The membrane inside the shell leaves the cap 6A adhering to the main shell at the point of near approach of the holder 9 to the edge of the orifice 7.

At the head C, the little end of the egg is pierced.

At the head D, a bell 20 surrounds the mouth 5 of the cup 4, and a passage 20A admits gaseous pressure from the pipe 10 to the enclosure thus formed. The big end of the egg being assumed to have a circular cross-section to fit the bottom orifice 7, the enclosure is sealed, so that the egg is subjected to external pressure while that pressure is also exerted through the pierced hole on the inside of the shell. As a result, the cap 6A is blown away from the bottom of the egg and the contents of the egg are expelled downwardly. The cap 6A, supported by the holder 9, guides the contents smoothly, to minimise risk of breaking the yolk X as it slides, together with the white Y, to a receiving tray 21.

The tray 21 is detachably pivoted lengthwise at 22 to the front face 1A (FIGURE 3) of the frame 1 and is ordinarily in horizontal position. Receipt of the contents in the tray affords an opportunity for inspection by the operator, who may then depress the tray or retain it until say two, three, or four contents have been received.

Should sealing of the enclosure formed by the head D have been prevented by the relatively rare instance of a non-circular egg imperfectly fitting the bottom orifice 7, the necessary pressure internally of the shell cannot develop at the head D. The next head E rectifies this situation, by a hood 23 of that head forming an enclosure (to which pressure is transmitted from the pipe 10 by a passage 23A) with the little end of the egg by a resilient bottom disc 23B having an orifice to surround the pierced hole in the little end. The pressure direct on the inside of the shell causes the contents to be discharged, again to be received by the tray 21.

The tray 21 extends along the four heads B . . . E, and serves to catch the contents of eggs inadvertently discharged at either head B or head C, instead of at the pressure-supplying head D or E.

If the contents of the or each egg caught by the tray 21 are seen to be correct, i.e., yolk unbroken or egg not bad, the tray 21 is lowered, for the contents to slide into a second tray 24 transversely pivoted at 24A (FIGURE 3) between its open ends 24B, 24C. For satisfactory contents, the end 24B is lowered, when yolks X and whites Y together are received on an inclined separating tray 25, with a narrow slot 25A along its bottom to retain the yolks X while the whites Y run through the slot 25A to another inclined tray 26 below. From the lower ends of the trays 25, 26, the separated yolks and whites are collected in individual receptacles (not shown).

The shells leaving the head D or the head E retain a certain amount of adhering white. This is removed at heads F1, F2, F3, each of which has a nozzle, connected to the pipe 10, to enter the pierced hole and to discharge either by tangentially directed holes 27A, 27B of progressively different obliquity or by more direct discharge as at 27C, to subject the inside of the shell and of the cap 6A to a scavenging action. This further amount of white is collected by a tray 28, which discharges into the separating tray.

The empty shells are discharged from the cups 4 as the chain 2 passes round the sprocket 3B. Should a cap 6A be retained in a holder 9, a nozzle 29 connected to the pipe 10 by a flexible connection 29A blows it out of the inverted holder along the bottom run 2B.

If a bad egg is received by the tray 21, the operator stops the machine, removes the tray and replaces it by a clean tray before re-starting the machine.

If contents with a broken yolk are received by the tray 21, it is tipped to discharge into the tray 24, which in turn is tipped to discharge such contents Z by the end 24C into a separate collecting tray 30. Return of the tray 24 for discharge by the end 24B permits normal operation. Advantageously, the machine is stopped by the act of tipping the tray 24 for discharge by the end 24C and re-started by tipping it for discharge by the end 24B.

Should an egg break as it is being deposited in a cup 4, its contents are received by a tray 31, for separate collection.

The heads A . . . F3 are readily accessible by raising the arms 11 to the vertical position 11B (FIGURE 3), whether for cleaning, or for replacement by detachment from the support pipe 10. The slicing device 19, 19A may also be removable for replacement.

The intermittent movement of the conveyor 2 and the related movement of the pipe 10 and the heads A to F may be effected or controlled mechanically, electrically, or electronically, hydraulically, or pneumaticaly, or by a combination of any two or more of these.

Since all the heads A to F3 are raised and lowered with the pipe 10, the major movements of the machine are those of two units only, the conveyor 2 and the pipe 10, both of which repeat their movements in a cycle covering the time taken by any cup 4 of the conveyor between starting from its position of rest below any one head and starting from its position of rest below the next succeeding head. This cycle is represented in FIGURE 4 as one complete revolution of a circle, starting at $a$ and taking place counter-clockwise. In the four concentric zones of FIGURE 4, the operative periods of the conveyor 2 and the pipe 10 are arcs of the first and second zones from the inside, the respective arcs being designed by the corresponding numerals 2 and 10; the operative period of the knife 19 is a short arc in the third zone, designated by the corresponding numeral 19; and the period during which gaseous pressure is applied to the pipe 10 by opening of the valve 14 is an arc of the fourth (outermost) zone, designated by the corresponding numeral 14.

When the conveyor 2 begins to move at $a$, the pipe 10 is half-way through its lifting movement of 90° of the cycle, with all the heads clear of eggs 6 in the cups 4, so that at $b$, i.e., after 45°, the pipe 10 comes to rest at its uppermost position. At $c$, after 90° in that position, the pipe 10 begins to descend, and at $d$ is half-way through its falling movement of 90° when the conveyor 2 stops after 180° of movement.

At *e*, just before the pipe completes 90° of movement, the valve 14 is opened. From *d* to *f* the pipe 10 has brought all the heads A to F3 into operative association with all eggs 6 in the cups 4 in the upper run 2A of the conveyor finding themselves below the heads, and admission of gaseous pressure at *e* causes pressure to be maintained at the heads D to F3 during the operative association of those heads with their respective heads.

At *g*, 5° after the head B has held its egg, the knife 19 makes a rapid stroke, occupying 10° and ending at *h*. Thereafter, over 90° measured from *f*, and ending at *i*, the pipe 10 remains at its lowermost position, and the contents of the eggs under the heads D to F3 are removed by the maintenance of the gaseous pressure, the conveyor 2 continuing to be at rest. Throughout the arc *e* to *j*, gaseous pressure is supplied to the nozzle 29 for removing any cup 6A retained in a holder 9 in the bottom run 2B of the conveyor.

At *i*, the pipe 10 begins its upward movement over 90°, and just after this, at *j*, the valve 14 is closed. The pipe 10 is again half-way through its upward movement of 90° at *a* when the conveyor 2 begins to move at the start of the next cycle.

What I claim is:

1. A machine for emptying eggs, comprising a conveyor, egg-receiving cups spaced along the conveyor, means to guide the conveyor along a run in which the cups are mouth-uppermost, the bottom of each cup having a circular orifice through which can protrude the lower end of an egg received in the cup, operating heads disposed above the said run of the conveyor with the same spacing as the cups, the conveyor being movable to bring each cup in the run to rest under each head in turn, and the heads being movable between raised and lowered positions, in which latter positions they come into operative association with eggs in the cups respectively below them, one head being provided with means to hold an egg down in its cup, slicing means associated with that head movable to sever partially from the egg the lower end protruding through the circular orifice, a subsequent head being provided with piercing means separate from and at all times spaced substantially above the level of said slicing means, said piercing means being disposed for vertical movement downwardly from above the said cup and egg to such a limited degree as to penetrate the upper end only of the said egg, and a further subsequent head being formed to enclose the mouth of its cup, a connection for the supply of gaseous pressure to the head and to the enclosure formed by it with the cup, and thence to the interior of the egg through the hole pierced by the previous head, and a receiving tray to catch the contents discharged through the sliced big end by the pressure applied through the hole.

2. A machine as in claim 1, comprising a holder at each cup, carried in downwardly inclined position from one edge of the bottom orifice of the cup, to support the big end sliced from an egg.

3. A machine as in claim 1, comprising a head previous to the head for holding an egg down in its cup, the previous head being provided with means to engage the periphery of an egg in its cup, to centre the egg in the cup.

4. A machine as in claim 1, comprising a still further head disposed subsequent to the head that encloses the mouth of its cup, the still further head being provided with a hood, said hood having a resilient bottom formed with an orifice to effect sealing round the hole pierced in the upper end of an egg in its cup, a connection for the supply of gaseous pressure to the hood and thence onto the resilient bottom to effect sealing, and also through the hole direct to the interior of the egg for the discharge of contents that have failed to be discharged at the previous head.

5. A machine as in claim 1, comprising at least one further and subsequent head, the head being provided with a nozzle to enter the hole pierced in the upper end of an egg in its cup, and a connection for the supply of gaseous pressure to the nozzle for the removal of white of egg remaining residually in the egg.

6. A machine as in claim 1, comprising a pivotally mounted tray disposed below the said run of the conveyor to catch the contends discharged from the eggs, and a second tray to receive the contents upon pivoting of the first tray.

7. A machine as in claim 1, comprising a pivotally mounted tray disposed below the said run of the conveyor to catch the contents discharged from the eggs, and a second tray to receive the contents upon pivoting of the first tray, the second tray being open at both ends and transversely pivoted between its ends, together with a separate collecting means below the ends of the second tray for one or the other to receive collected contents upon appropriate pivoting of that tray.

8. A machine for emptying eggs, comprising an endless conveyor guided to provide an upper run, egg-receiving cups spaced along the conveyor, facing mouth-uppermost along the upper run and inverted along the lower run, each cup having a circular bottom orifice, a successsion of heads disposed above the upper run with the same spacing as the cups, the heads being movable together between raised and lower positions, in which latter position each head comes into association with a cup brought below it by the conveyor, slicing means for partial severing from each egg in turn of a cap from the lower end of the egg protruding through the bottom orifice of the cup containing it, one head being provided with piercing means separate from and at all times substantially spaced above the level of said slicing means, said piercing means being normally spaced above said cup and the egg therein, and movable downwardly to such a limited degree as to penetrate the upper end only of the egg, and at least one further head having a connection to a supply of gaseous pressure to be applied by that head through the hole pierced in the said upper end, for discharge of the contents through the hole formed at the big end by the slicing of the cap.

9. A machine as in claim 8, comprising a tray below the upper run of the conveyor to catch the discharged contents of the eggs, a bottom-slotted separating tray to receive the contents from the first tray, and a further tray to receive white of egg separated from the yolks by flowing through the bottom of the separating tray.

10. A machine as in claim 8, comprising a nozzle directed at each cup in turn in the lower run of the conveyor to detach any big end of an egg that may remain attached to the cup.

11. A machine as defined in claim 10, in which said cups are disposed in a single row only extending in the direction of movement of the conveyor.

References Cited in the file of this patent
UNITED STATES PATENTS

| | | |
|---|---|---|
| 1,837,357 | Chapman | Dec. 22, 1931 |
| 2,445,490 | Meade | July 20, 1948 |
| 2,594,619 | Bosch et al. | Apr. 29, 1952 |